Jan. 14, 1936.                H. M. WEIR                  2,027,410
                        FLUID CONTACTING APPARATUS
                           Filed May 24, 1932
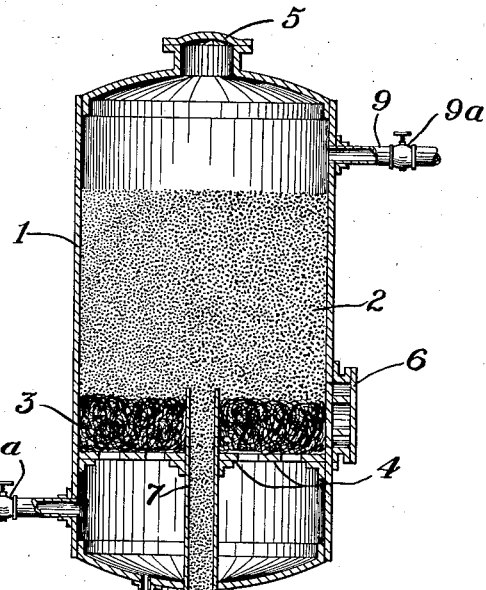
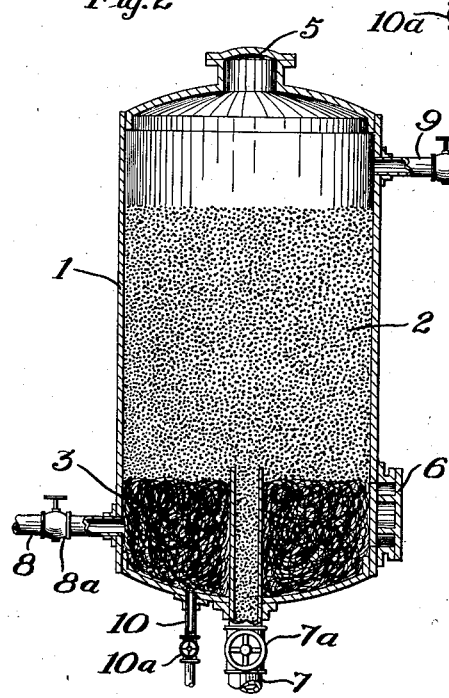
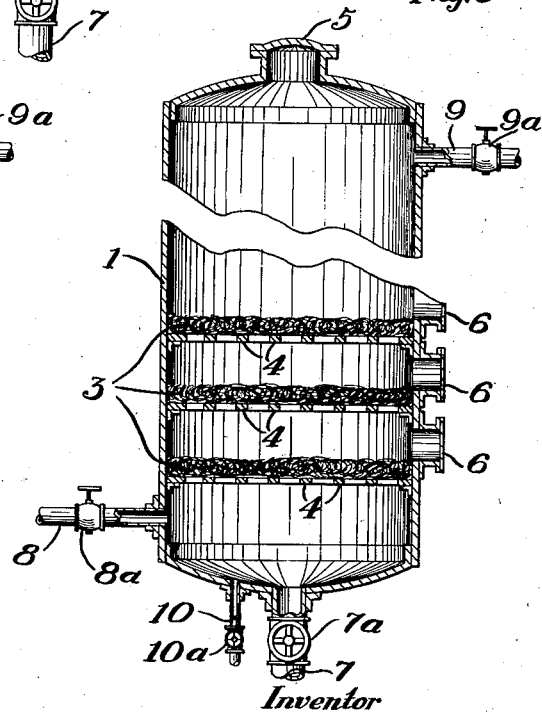
Inventor
Horace M. Weir
By T. Wallace Quinn
his Attorney Patented Jan. 14, 1936

2,027,410

UNITED STATES PATENT OFFICE 2,027,410

FLUID CONTACTING APPARATUS

Horace M. Weir, Philadelphia, Pa., assignor to The Atlantic Refining Company, Philadelphia, Pa., a corporation of Pennsylvania Application May 24, 1932, Serial No. 613,245

3 Claims. (Cl. 210—134)

The present invention relates to means for supporting or separating pulverulent solids. More particularly, the invention contemplates supporting or separating means of high void space through which a liquid or gas will pass without any substantial resistance. Such means comprises metal wools, particularly steel wool, or other like filamentous masses of high void space of substantial mechanical strength.

The use of a filamentous wool as a supporting means may be exemplified in the support of percolation filter beds or other filter beds, or in the support of pulverulent contacting materials in general, such as the support of clay in a tower with which petroleum vapors are contacted to stabilize them against subsequent formation of gums or colored materials, or such as the support of lime or calcium chloride in a dehydrating tower.

The use of filamentous wool for separating pulverulent solids may be illustrated where a single tower is to be employed to effect both a dehydration and sulfur removal of a gas by passing the gas in series through a layer of dehydrating agent such as calcium chloride and then through a layer of iron oxide, the calcium chloride and iron oxide being separated by means of steel wool or equivalent filamentous material. The use of filamentous materials as separating means is in reality an aspect of their use as supporting means, their function being to support the material and yet allow a ready and substantially unrestricted passage of fluids which are being treated.

Pulverulent materials such as contained in filter beds, especially filter beds of the percolation type, are ordinarily supported by canvas cloth, metal screens, or the like. My invention provides for the replacement of such supporting means by a filamentous material such as steel wool, preferably in the form of a mat or mattress. The filamentous mat in turn is supported by suitable construction such as a coarse screen under which, in turn, are beams which extend across the filter apparatus beneath the filter bed. Or, if desired, the steel wool may be placed directly on the bottom of the tower or container, the draw-off or admission of fluids being made from points around the periphery of the steel wool bed, for example.

I have found that when canvas cloth or fine metal screens are employed to support the pulverulent material, such as clay or fuller's earth, for example, that a great resistance to the passage of the fluid is incurred in the passage of the material through the lower portion of the bed, i. e., through the screen or canvas. The clay or filter medium or other pulverulent medium tend to pack into the pores or holes in the supporting means in a compact form. The effective cross sectional area of a filter bed is only as great as that of its smallest cross section; and, in effect, the cross section of the fitler bed is only as great as the combined area of the openings in the supporting means, at least where the openings are large enough so that the clay or filtering medium can get into the holes or openings of the support. In addition, seemingly the clay in the openings or perforations of the supporting means is in a highly compacted state, making the resistance even greater than the reduction in cross section would alone suggest. The openings in the canvas are apparently small enough to eliminate this packing of the filtering medium in the openings of the supporting means to some extent. The canvas itself, however, provides such a higher resistance to the flow of liquid through it that, in general, wire screen is superior to the canvas. In the case of the wire screen, the openings are of necessity, from the point of strength, economy, and percent voids, large enough so that filtering medium packs into the holes or voids. Since the void spaces in a wire screen are only of the order of 40 or 50 percent, at the most, of the combined cross sectional area of the wire screen, it means that a clay bed supported by a wire screen has its effective cross sectional area of filtration, or passage of fluids in general, reduced respectively to substantially 40 or 50 percent of its actual cross sectional area, this due to the fact that the liquid must pass through the screen, the holes of which are filled with clay.

I have found that, if in place of being supported on a wire screen or canvas cloth or the like, the bed of pulverulent material be supported by a filamentous mass of material, such for example, as steel wool or other metal wool or like material of substantial mechanical strength so that the void space within such filamentous mass remains high even when it is supporting the bed of pulverulent material, this difficulty of ordinary filter beds can be eliminated or at least greatly reduced. In contrast to wire screen, the voids in steel wool, even under such pressures as are incurred in the support of clay beds, for example, pressures of the order of 6 lbs. per square inch for a bed of the depth of 12 to 15 feet, are equal to more than 90% of the volume of the steel wool; and, correspondingly, the cross sectional voids are equal to more than 90% of the cross section of the steel wool, and likewise, to more than 90% of the cross section of the filter bed. Void spaces in steel wool will generally be of the order of 95% or more of the cross section of the steel wool; in other words, the presence of the steel wool reduces the cross sectional area of the filter only very slightly, for example, to the extent of 5% of the cross sectional area of the filter. In addition, the steel wool provides smaller openings than a wire screen which prevents to a substantial extent the wedging of filtering materials in the openings. Also, the steel wool is much cheaper and longer lived than wire screen.

Since the capacity of a filter is limited by its smallest effective cross sectional area, the elimination of the substantial restriction which heretofore was incident to the normal support of filter beds, and the provision in lieu thereof, of means for supporting filter beds, which means will not substantially restrict the actual cross sectional area of the bed, results in increase of capacity of any given filter bed. And what has been said, using filtration as a specific reference, is in general true in a similar way in the contacting of any fluid with a pulverulent solid.

My invention is exemplified in the accompanying drawing in which:

Fig. 1 is a sectional view which illustrates the use of filamentous wool as a supporting means for a bed of pulverulent filtering or contacting material;

Fig. 2 is a modification of Fig. 1 showing, in similar section, a simplified means of construction adaptable where a filamentous wool is employed;

Fig. 3 specifically illustrates the application of a filamentous wool for separating a plurality of layers of treating and/or filtering materials, the treating materials themselves being omitted from the figure.

The apparatus illustrated in any one of the three figures may be employed either for the treatment of liquids, vapors, or gases, as desired, and may be employed under normal or higher or lower temperatures, and under atmospheric, superatmospheric, or sub-atmospheric pressures. Like designations in the several figures refer to similar parts.

In Fig. 1, 1 is a tower containing filtering or contacting material 2, supported on filamentous wool 3. The filtering or contacting material may be clay, fuller's earth, or the like. The filamentous wool comprises steel wool, copper wool, or other filamentous material of substantial mechanical strength, the steel wool in general being preferable, except where it is found to be appreciably deteriorated by the fluids being filtered. The filamentous wool 3 is in turn supported on supports or beams 4. The tower 1 is provided with a manhead 5 at the top thereof through which filtering or contacting material may be introduced into the tower. The manhead when closed renders the tower fluid-tight. The tower is provided with another and similar manhead 6 through which filtering or contacting material and/or filamentous wool may be removed. Discharge pipe 7 provided with valve 7a may also serve as a means of removal of the contacting material. Pipes 8 and 9 equipped respectively with valve 8a and 9a, are provided for the admission and emission of fluid, i. e., gas or liquid to be treated. If the fluid to be treated is a gas or vapor, such as petroleum vapors which are to be contacted with a suitable material to stabilize the same, then ordinarily admission will be made through pipe 8 and emission will be accommodated through pipe 9. On the other hand, if the fluid to be treated is a liquid, which requires, for example, a filtration or percolation treatment, then, in general, admission will be made through pipe 9 and emission of the fluid will be had through pipe 8.

Various features of construction, including modification or addition to the features shown, may obviously be employed depending on such factors, for example, as the type and quantity of material to be treated, the particular treatment to be effected, desired temperature and pressure conditions, etc. However, since the means of supporting a pulverulent material, or separating layers thereof, is the feature with which the invention is primarily concerned, the discussion of modifications and preferred embodiments of the invention need be concerned only with the supporting means and matters directly related thereto. The supporting means 3, which comprises a bed of steel wool or the like is preferably in the form of a steel wool mat or mattress. The steel wool may be enclosed within a covering of metal netting such as chicken wire or the like and the wire tied through with metal analogously to the tying of an ordinary quilt or mattress. The steel wool is preferably made to fit the filtering apparatus and in form may be compared to an ordinary mattress with its cotton filling replaced by steel wool, the cloth covering replaced by chicken wire or the like, and the threads which tie the mattress together replaced by wire tying means.

It is to be understood that while the above described construction of the steel wool mat is a preferred construction, the invention is not limited thereto. In place of such construction, for example, the steel wool might be applied directly on top of beams or other supports and the clay or other pulverulent material applied thereon without the steel wool being bound into the form of a mattress. Or, if desired, the steel wool might be supported on top of a perforated metal plate or wire screen which in turn is supported by beams. The difficulties encountered when the clay bed is supported directly on the wire screen are not encountered when there is an intervening mat of steel wool between the wire screen and clay bed, because in the latter case, the clay would not get into the pores of the metal support. The openings in the screen or perforated metal plate being entirely free of clay, such openings are able to easily carry the liquid which passes through the filter without any resistance to the filtration.

Fig. 2 shows, as a simplified structure suitable in many treating processes, particularly in most percolation treatments, a thick bed of filamentous wool 3, of substantial mechanical strength such as steel wool, placed on the solid bottom of a suitable tower or container 1 and a pulverulent material 2, such as clay, placed thereabove, its weight being supported by the steel wool or equivalent filamentous material. One or more liquid draw-offs 8, or inlet pipes as the case may be, may be located at the periphery of the steel wool bed at a point or points adjacent the junction of the steel wool with the solid bottom of the tower or container. By this structure, the necessity of beams and metal plates and screens as part of the supporting equipment for the clay bed is eliminated; and, due to the high void space of the steel wool, the discharge of filtrate by this means does not incur any substantial back pressure on the filter bed.

Fig. 3 shows the use of filamentous wool 3 for maintaining within separate layers, in the same container, a plurality of pulverulent materials. The structural supports or beams 4 may be supplied as a gage for the thickness of the intervening layers of pulverulent materials and for making possible the discharge of one layer of material and its replacement by a fresh layer without the disturbance of the remaining layers of pulverulent treating materials. Manheads 6 illustrate a suitable provision whereby this exchange of spent for fresh treating materials may be made. However, in some applications the beam supports may have no merit and the filamentous wool separating two layers of treating material may be supported directly by the lower layer. For clearness in showing the structure, a particular showing of the pulverulent treating materials in the several layers is omitted from this figure.

While in Fig. 3 the filamentous wool is shown as horizontally placed mats, such separating means may be employed as vertically arranged mats in a tube or chamber through which the fluid being treated is made to flow horizontally.

A drain pipe 10, supplied with a valve 10a, is shown for each tower, whereby collected liquid can be completely drained from the tower.

What I claim is:

1. In apparatus for processing a fluid in which contacting of the fluid with a bed of solid particles is effected, means for supporting said bed of solid particles which comprise a layer of steel wool in contact with the lower surface of said bed, and supporting means for the layer aforesaid.

2. Means in which processing of a fluid, which involves contacting the fluid with a bed of solid particles, may be effected, which comprise a chamber having at least one opening near the top thereof, a relatively thick layer of steel wool resting on the bottom of said chamber, a bed of solid particles above said layer of steel wool and resting thereon, and at least one opening for the admission or emission of fluid at the periphery of the layer of steel wool.

3. In apparatus for processing a liquid in which percolating the liquid through a bed of solid particles is effected, means for supporting said bed of solid particles which comprise a layer of steel wool in contact with the bottom surface of said bed and suitable rigid supporting means below and in contact with said layer of steel wool.

HORACE M. WEIR.